United States Patent
Saitoh

(10) Patent No.: US 8,049,843 B2
(45) Date of Patent: Nov. 1, 2011

(54) POLARIZING PLATE AND LIQUID-CRYSTAL DISPLAY DEVICE

(75) Inventor: Yukito Saitoh, Minami-ashigara (JP)

(73) Assignee: FUJIFILM Corporation, Minato-Ku, Toyko (JP)

( * ) Notice: Subject to any disclaimer, the term of this patent is extended or adjusted under 35 U.S.C. 154(b) by 511 days.

(21) Appl. No.: 12/362,869

(22) Filed: Jan. 30, 2009

(65) Prior Publication Data

US 2009/0195733 A1  Aug. 6, 2009

(30) Foreign Application Priority Data

Jan. 31, 2008 (JP) ................... 2008-020149

(51) Int. Cl.
*G02F 1/1335* (2006.01)
(52) U.S. Cl. .......... 349/96; 349/105; 349/117; 349/118; 349/119; 349/120; 349/121
(58) Field of Classification Search ........ 349/96, 349/105, 117, 118, 119–121
See application file for complete search history.

(56) References Cited

U.S. PATENT DOCUMENTS

| | | | | |
|---|---|---|---|---|
| 5,680,184 A | * | 10/1997 | Nishino | 349/78 |
| 2001/0029638 A1 | * | 10/2001 | Bobrov et al. | 8/506 |
| 2005/0196550 A1 | * | 9/2005 | Lazarev et al. | 428/1.1 |
| 2006/0164571 A1 | | 7/2006 | Broer et al. | |
| 2009/0021671 A1 | * | 1/2009 | Fukagawa et al. | 349/96 |

FOREIGN PATENT DOCUMENTS

| | | |
|---|---|---|
| JP | 10-268294 A | 10/1998 |
| JP | 2001-242320 A | 9/2001 |
| JP | 2001-350022 A | 12/2001 |
| JP | 2006-503325 A | 1/2006 |

* cited by examiner

*Primary Examiner* — Huyen Ngo
(74) *Attorney, Agent, or Firm* — Buchanan Ingersoll & Rooney PC

(57) ABSTRACT

Disclosed is a polarizing plate comprising at least first and second polarizing elements and satisfying (1) $kx_1 > ky_1 = kz_1$, (2) $kz_2 > ky_2$ and (3) $(kx_1 - ky_1) \times d_1 > (kz_2 - ky_2) \times d_2$, wherein an x-axis and a y-axis are in-plane axes crossing perpendicularly to each other, and a z-axis is the axis crossing perpendicularly to the x-y axis plane; $kx_1$, $ky_1$ and $kz_1$ each are the absorption coefficient in the x-axis, y-axis and z-axis directions, respectively, of the first polarizing element; $ky_2$ and $kz_2$ each are the absorption coefficient in the y-axis and z-axis directions, respectively, of the second polarizing element; and $d_1$ and $d_2$ each are the thickness (unit: nm) of the first and second polarizing elements, respectively.

7 Claims, 1 Drawing Sheet

POLARIZING PLATE AND LIQUID-CRYSTAL DISPLAY DEVICE

CROSS-REFERENCE TO RELATED APPLICATIONS

This application claims benefit of priority under 35 U.S.C. 119 to Japanese Patent Application No. 2008-020149 filed on Jan. 31, 2008, which is expressly incorporated herein by reference in its entirety.

BACKGROUND OF THE INVENTION

1. Field of the Invention

The present invention belongs to a technical field of widening a viewing angle of a polarizing plate, concretely relating to a wide-view polarizing plate and a liquid-crystal display device employing it.

2. Related Art

A transmissive liquid-crystal display device generally comprises a pair of polarizing plates disposed with their polarization axes kept perpendicular to each other. However, even when the two polarizing plates are so disposed that their polarization axes could cross perpendicularly to each other, they may be still shifted from perpendicular crossing configuration relative to the incident light running in oblique directions. This is one reason for light leakage in oblique directions in the black state of liquid-crystal display devices. Accordingly, for providing a liquid-crystal display device having excellent viewing angle characteristics, it is important to solve a problem of viewing angle dependence of polarizing plate. Heretofore, for wide-view polarizing plates, various proposals have been made for combining a polarizing element and a retardation layer having predetermined optical characteristics (for example, JP-A No. 2001-350022). Also proposed is use of a polarizing element of which the refractive index in the transmission axis direction falls within a predetermined range (JP-A No. H10-268294). Further, as a polarizing plate having wide-view characteristics, proposed is a laminate polarizing plate constructed by combining a polarizing element with the light absorption axis in the pale of the plate and a polarizing element with the light absorption axis in the thickness direction of the plate (for example, JP-A 2001-242320 and JP-T 2006-503325).

SUMMARY OF THE INVENTION

An object of the invention is to provide a novel wide-view polarizing plate, and a liquid-crystal display device employing it and having improved viewing angle characteristics. The means for achieving the object are as follows.

[1] A polarizing plate comprising at least first and second polarizing elements and satisfying following formulae (1) to (3):

$$kx_1 > ky_1 = kz_1 \quad (1)$$

$$kz_2 > ky_2 \quad (2)$$

$$(kx_1 - ky_1) \times d_1 > (kz_2 - ky_2) \times d_2 \quad (3)$$

wherein an x-axis and a y-axis are in-plane axes crossing perpendicularly to each other, and a z-axis is the axis crossing perpendicularly to the x-y axis plane; $kx_1$, $ky_1$ and $kz_1$ each are the absorption coefficient in the x-axis, y-axis and z-axis directions, respectively, of the first polarizing element; $ky_2$ and $kz_2$ each are the absorption coefficient in the y-axis and z-axis directions, respectively, of the second polarizing element; and $d_1$ and $d_2$ each are the thickness (unit: nm) of the first and second polarizing elements, respectively.

[2] The polarizing plate as set forth in [1], wherein the second polarizing element satisfies following formula (2a):

$$kz_2 > kx_2 = ky_2 \quad (2a)$$

wherein $kx_2$ is the absorption coefficient in the x-axis direction of the second polarizing element.

[3] The polarizing plate as set forth in [2], wherein the second polarizing element satisfies the following formula:

$$5 \text{ nm} \leq (kz_2 - ky_2) \times d_2 \leq 80 \text{ nm}.$$

[4] The polarizing plate as set froth in [1] or [2], wherein the second polarizing element satisfies following formula (2b):

$$kz_2 = kx_2 > ky_2 \quad (2b)$$

wherein $kx_2$ is the absorption coefficient in the x-axis direction of the second polarizing element.

[5] The polarizing plate as set forth in [4], wherein the second polarizing element satisfies the following formula:

$$5 \text{ nm} \leq (kz_2 - ky_2) \times d_2 \leq 100 \text{ nm}.$$

[6] The polarizing plate as set forth in any one of [1] to [5], wherein the second polarizing element comprises molecules having absorption anisotropy for visible light.

[7] A liquid-crystal display device comprising at least a liquid-crystal cell and a polarizing plate as set forth in any one of [1] to [6].

According to the invention, it is possible to provide a novel wide-view polarizing plate, and a liquid-crystal display device employing it and having improved viewing angle characteristics.

Figure 1:
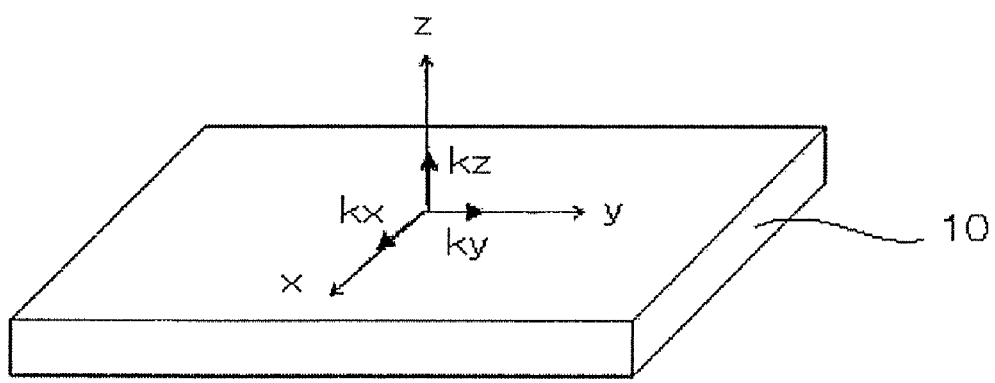
FIG. 1 is a perspective view of a polarizing plate, herein employed for describing the invention.

In the drawings, the reference numerals have the following meanings.

10 Polarizing plate
12 First Polarizing Element
14 Second Polarizing Element

DETAILED DESCRIPTION OF THE INVENTION

The invention is described in detail hereinunder. In this description, the numerical range expressed by the wording "a number to another number" means the range that falls between the former number indicating the lowermost limit of the range and the latter number indicating the uppermost limit thereof. Also in this description, unless otherwise specifically indicated, the wavelength λ nm in a visible light range is 550 nm, and also unless otherwise specifically indicated, the data of refractive index and absorption coefficient are represented by those at the wavelength 550 nm.

The invention relates to a polarizing plate having first and second polarizing elements and satisfying following formulae (1) to (3):

$$kx_1 > ky_1 = kz_1 \quad (1)$$

$$kz_2 > ky_2 \quad (2)$$

$$(kx_1 - ky_1) \times d_1 > (kz_2 - ky_2) \times d_2 \quad (3)$$

As in the perspective view of FIG. 1, in-plane axes of a polarizing plate that cross perpendicularly to each other are an x-axis and a y-axis, and the axis perpendicular to the x-y plane is a z-axis. The symbols of $kx_1$, $ky_1$ and $kz_1$ each are an absorption coefficient in the x-axis, y-axis and z-axis direction, respectively, of the first polarizing plate; the symbols of $ky_2$ and $kz_2$ each are an absorption coefficient in the y-axis and z-axis direction, respectively, of the second polarizing plate; $d_1$ and $d_2$ each are the thickness (unit: nm) of the first and second polarizing elements, respectively.

A conventional absorption-type polarizing element generally used in a liquid-crystal display device has a function of absorbing light that vibrates in one direction to thereby convert it into light that vibrates in a direction perpendicular to that original vibration direction, or into linear polarized light. The polarizing element of the type has an absorption axis, which generally corresponds to an optical axis direction in a monoaxial birefringent substance, and a transmission axis perpendicular to it, both of which are in-plane axes. In other words, a conventional absorption-type polarizing element generally satisfies a relationship of $kx_1 > ky_1 = kz_1$. The absorption coefficient is represented by the imaginary component of birefringence, and is generally represented by k. The absorption coefficient in the absorption axis direction of a conventional absorption-type polarizing element generally used in a liquid-crystal display device is around 0.02 or so, and the absorption coefficient in the transmission axis direction thereof is around $4.5 \times 10^{-4}$ or so. Of such a conventional absorption-type polarizing element, the absorption coefficient in the thickness direction (the direction normal to the plane of the polarizing element) is nearly on the same level as that of the absorption coefficient in the transmission axis direction thereof. For example, in FIG. 1, when the x-axis is an absorption axis and the y-axis is a transmission axis, then the first polarizing element satisfying formula (1) has the property that the absorption coefficient $kx_1$ in the absorption axis direction is larger than the absorption coefficient $ky_1$ in the transmission axis direction and the absorption coefficient $kz_1$ in the thickness direction, and it may be said that conventional absorption-type polarizing elements are all usable as the first polarizing element.

Regarding $ky_1 = kz_1$ in formula (1), the two are not required to be strictly the same, but the error range allowable in the technical field of polarizing plates is also allowable in the relationship of $ky_1 = kz_1$.

On the other hand, the second polarizing element satisfies formula (2), or that is, this is characterized in that the absorption coefficient $kz_2$ in z-axis direction (thickness direction) is larger than the absorption coefficient $ky_2$ in the y-axis direction, and this differs from a conventional absorption-type polarizing element. In the invention, the first polarizing element is combined with the second polarizing element that differs from the first polarizing element in point of the absorption anisotropy direction between the two, thereby to rotate the polarization axes of the two to solve the problem that the polarization axes may shift from the perpendicularly-crossing configuration. Specifically, the second polarizing element has the function of correcting the shift of the polarization axis of the first polarizing from the perpendicularly-crossing configuration when the incident light runs into it in oblique directions. For making efficient use of the function of the second polarizing element and, in addition, for preventing the second polarizing element from lowering the polarizing function of the first polarizing element, according to the invention, the first and second polarizing elements are combined so that they satisfy formula (3). The product of the anisotropy (for example, kx–ky) of the absorption coefficient, k, in a predetermined direction of a polarizing element and the thickness, d, thereof may be said to be an index of the polarizing capability in that direction of the polarizing element. According to the invention, the absorption capability in the Z-axis direction of the second polarizing element is made lower than the absorption capability in the x-axis direction of the first polarizing element, whereby the viewing angle dependence owing to the second polarizing element is reduced and the combined structure can thereby attain wide-view characteristics, not detracting from the polarizing function of the first polarizing element.

Heretofore, it has been known to construct a wide-view polarizing plate hardly influenced by viewing angle change, by combining a polarizing element having an absorption in a horizontal direction and a polarizing element having an absorption in a vertical direction to thereby reduce the light leakage in oblique directions through the combined structure. However, as a result of assiduous studies, the present inventors found that, according to the related art by itself, it is not possible to prevent the light leakage in oblique directions completely. More concretely, depending on the polarization capability of the horizontal-direction polarizing element and the polarization capability of the vertical-direction polarizing element to be combined together, the combined structure could not still prevent off-axis light leakage (at a viewing angle in a 45-degree shifted direction from the polarizing plate absorption axis site of one polarizing element) completely, and in addition, it could not sufficiently prevent front-direction light leakage. In the invention, the wavelength characteristics in absorption are taken into consideration, and the fact is specifically noted that, when transmitted light is absorbed by a polarizing element, the polarization state changes depending on the degree of the absorption anisotropy of the polarizing element. As a result of investigations, the inventors found that the degree of polarization change significantly depends on the value obtained by dividing the product of the absorption anisotropy $\Delta k$ and the thickness d, by the wavelength $\lambda$, and that, by controlling the value, the light leakage can be completely prevented. Specifically, for increasing the contrast that has an important meaning in the technical field of display devices, the product of the absorption anisotropy $\Delta k$ and the thickness d at a wavelength 550 nm at which the view sensitivity is the highest must fall within a preferred range. As a result of further investigations promoted on the basis of this finding, the inventors found that, for preventing light leakage in oblique directions and also for sufficiently preventing light leakage in the front direction (normal direction to plane), the absorption anisotropy in the horizontal direction must be higher than the absorption anisotropy in the vertical direction, or that is, formula (3) must be satisfied. The polarizing plate of the invention satisfies formulae (1) to (3), in which, therefore, the first polarizing element having high absorption anisotropy in the horizontal direction can convert light into polarized light at a high polarization degree and the light leakage in the front direction can be thereby sufficiently prevented, and further, the second polarizing element that has a lower polarization capability in the vertical direction than the first polarizing element can prevent light leakage in oblique directions and the light leakage in oblique directions can be thereby prevented still with preventing the light leakage in the front direction as such.

In the polarizing plate of the invention, $kx_1$, $ky_1$ and $kz_1$ of the first polarizing element are not specifically defined. As mentioned in the above, the first polarizing element may be selected conventional absorption-type polarizing elements; and from this viewpoint, $kx_1$ may be from 0.01 to 0.03 or so, $ky_1$ and $kz_1$ each may be from $3 \times 10^{-4}$ to $6 \times 10^{-4}$ or so. The thickness $d_1$ of such s conventional absorption-type polarizing element is around 20 μm or so, and therefore the value of $(kx_1-ky_1) \times d_1$ may be from 190 to 590 nm or so (this corresponds to a polarization degree of from 97.5 to 99.9998% or so). Accordingly, it is easy to understand that the polarization capability of the polarizing element $(kx_1-ky_1) \times d_1$ may be controlled to fall within a desired range by fixing the thickness $d_1$ and changing the other parameters $kx_1$ and $ky_1$; or as in the formula, merely by changing $d_1$, $(kx_1-ky_1) \times d_1$ may be controlled to fall within a desired range. As a result of assiduous studies, the present inventors have confirmed that, when a conventional absorption-type polarizing element of which the value of $(kx_1-ky_1) \times d_1$ falls within a range of from 190 to 590 nm or so is used as the first polarizing element, and when the value of $(kz_2-ky_2) \times d_2$ of the second polarizing element to be combined with it is controlled to fall within a range of from 5 to 120 nm or so, then the combined structure can reduce leakage of the incident light running thereinto in oblique directions (directions at a polar axis 60° and at an azimuth angle 45°). However, in case where the polarizing plate is used in display devices such as liquid-crystal display devices or the like, it is important that the polarizing plate does not lower the brightness of the devices. Accordingly in such applications, it is important that not only the transmittance in perpendicular configuration (at the black state) but also the ratio of the white transmittance in parallel configuration to the black transmittance in perpendicular configuration, or that is, the contrast ratio (white transmittance/black transmittance) is high. As a result of assiduous studies, the inventors have confirmed that, when a conventional absorption-type polarizing element of which the value of $(kx_1-ky_1) \times d_1$ falls within a range of from 190 to 590 nm or so is used as the first polarizing element, and when the second polarizing element to be combined with it satisfies following formula (4):

$$5 \text{ nm} \leq (kz_2-ky_2) \times d_2 \leq 80 \text{ nm}, \quad (4)$$

then the contrast ratio with the incident light running thereinto in oblique directions (directions at a polar axis 60° and at an azimuth angle 45°) can be increased. In some embodiments, however, the preferred range should not be limited to the above-mentioned range.

The absorption coefficient $kx_2$ in the x-direction of the second polarizing element is not specifically defined. However, when $kx_2 < ky_2$, then the polarization capability of the first polarizing element in the x-y plane is cancelled by the second polarizing element, and this is unfavorable. Accordingly, preferably, the second polarizing element satisfies $ky_2 \leq kx_2$. On the other hand, when $kz_2 < kx_2$, then the second polarizing element may fail to exhibit its correcting effect mentioned in the above, and this is unfavorable. Accordingly, preferably, the second polarizing element satisfies $kx_2 \leq kz_2$. From these viewpoints, preferred examples of the second polarizing element include those satisfying following formula (2a) and those satisfying following formula (2b).

$$kz_2 > kx_2 = ky_2 \quad (2a)$$

$$kz_2 = kx_2 > ky_2 \quad (2b)$$

The second polarizing element satisfying formula (2a) may be produced, using a rod-shaped dye to be mentioned below; and the second polarizing element satisfying formula (2b) may be produced, using a discotic dye to be mentioned below. Of the second polarizing element satisfying formula (2a), when $(kz_2-ky_2) \times d_2$ oversteps the above-mentioned range of from 5 to 120 nm, then the effect of reducing viewing angle dependence may lower. The value $(kz_2-ky_2) \times d_2$ of the second polarizing element satisfying formula (2a) is preferably from 5 to 80 nm, more preferably from 20 to 80 nm, even more preferably from 40 to 60 nm.

On the other hand, the second polarizing element satisfying the above (2b) is characterized in that, even when its $(kz_2-ky_2) \times d_2$ oversteps the above range of from 5 to 120 nm, it still contributes toward reducing the light leakage in oblique directions. In particular, the value $(kz_2-ky_2) \times d_2$ of the second polarizing element satisfying formula (2b) is preferably from 5 to 100 nm, more preferably from 40 to 100 nm, even more preferably from 60 to 80 nm.

Regarding $kx_2 = ky_2$ and $kz_2 = kx_2$ in formulae (2a) and (2b), the two are not required to be strictly the same, but the error range allowable in the technical field of polarizing plates is also allowable in the relationship of $kx_2 = ky_2$ and $kz_2 = kx_2$.

The absorption coefficient in one direction of a polarizing element may be calculated from the data thereof found with a polarizing film analyzer (for example, Jasco's VAP-7070). Concretely, using this device, the single transmittance, the parallel transmittance and the vertical transmittance of a polarizing element can be determined; and based on these data, the transmittance "Ta" in the absorption axis direction of the polarizing element and the transmittance "Tt" in the transmission axis direction of the polarizing element can be calculated. The thickness "d" of the polarizing element is separately determined according to a different method with cross-sectional SEM or the like, and based on the previously found transmittance data, the absorption coefficient "k" of the polarizing element can be calculated according to the following formula:

$$k = -\log(T) \times \lambda / (4\pi d).$$

The absorption coefficient in the thickness direction may also be determined in the same manner as above. For example, the transmittance is determined at a polar angle of 40 degrees, and the absorption coefficient k can be determined by fitting the data in a theoretical formula, according to the above-mentioned formula and in consideration of the Snell's law and the Fresnel's equation.

Figure 2:
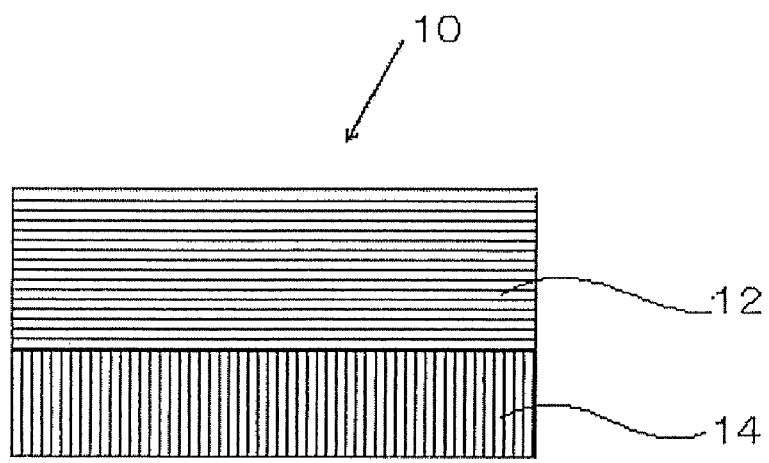
FIG. 2 is a schematic cross-sectional view of one example of the polarizing plate of the invention.

A graphical cross-sectional view of one example of the polarizing plate of the invention is shown in FIG. 2. The polarizing plate 10 of FIG. 2 is a laminate comprising a first polarizing element 12 and a second polarizing element 14. In case where the polarizing plate 10 is used in a liquid-crystal display device, it is so disposed therein that the second polarizing element 14 could be more inside than the first polarizing element 12. For example, in an embodiment where the polarizing plate 10 is used as a polarizing plate on the displaying side of a liquid-crystal display device, the second polarizing element 14 is preferably disposed on the side of the liquid-crystal cell therein. In an embodiment where the polarizing plate 10 is used as a polarizing plate on the backlight side of a liquid-crystal display device, the second polarizing plate 14 is preferably disposed on the side of the liquid-crystal cell therein.

The polarizing plate of the invention may have a protective film on the surface of the first and second polarizing elements to protect them. In case where the first polarizing element is formed of a polyvinyl alcohol film to be mentioned below, a protective film is preferably stuck to the surface of the first polarizing element for the purpose of protecting the element from external humidity. Also in case where the second polarizing element is formed of a highly moisture-pervious film such as a polyvinyl alcohol film, it is also desirable to stick a protective film to its surface. When a poorly moisture-pervious film is used for the second polarizing element, then it may serve also as a protective film for the first polarizing element.

The polarizing plate of the invention may further have an antireflection layer, an antistatic layer, a brightness-improving layer and the like that have heretofore been used as functional layers of polarizing plate. Further, not detracting from the effect of the invention, the polarizing plate of the invention may also have a birefringent layer for optical compensation in liquid-crystal display devices.

A method for producing the polarizing plate of the invention and the materials usable for its production are described in detail hereinunder.

The first polarizing element may be a conventional absorption-type polarizing element, as so mentioned in the above. For it, for example, a polarizing film containing a binder and iodine or a dichroic dye can be used. Iodine and a dichroic dye in a linear polarizing film are aligned in a binder to express a polarizing capability. Preferably, iodine and a dichroic dye are aligned along binder molecules, or a dichroic dye is aligned in one direction through self-organization like liquid crystals. At present, a commercial polarizing element is produced generally by dipping a stretched polymer film in a solution of iodine or a dichroic dye in a bath to thereby make iodine or the dichroic dye penetrate into a binder; and the polarizing film thus produced in that manner can be used as the first polarizing element in the invention.

The material for the second polarizing element is not also specifically defined. Any polarizing element satisfying formula (2) can be used. As one example, there is mentioned a method of producing the polarizing element by using a dye having absorption anisotropy for visible light, for example, a dichroic dye. According to the method, molecules of a dichroic dye are aligned so as to make the absorption coefficient anisotropy larger in the z-axis direction, thereby producing the second polarizing element satisfying formula (2). For the technique of aligning a dichroic dye in a desired direction, referred to is a technique of forming a polarizing element by the use of a dichroic dye, or a technique of producing a guest-host liquid-crystal cell. For example, the technique employed in a method of producing a dichroic polarizing device as in JP-A No. 2002-90526, and the technique employed in a method of producing a guest-host liquid-crystal display device as in JP-A 2002-99388 can be used in producing the second polarizing element in the invention.

Dichroic dyes can be classified into rod-shaped molecule dyes and discotic molecule dyes. Any of these may be used in producing the second polarizing element. Preferred examples of rod-shaped dichroic dyes are azo dyes, anthraquinone dyes, perylene dyes and mericyanine dyes. Examples of azo dye which can be used in the invention include those described in JP-A No. H11-172252; examples of anthraquinone dye which can be used in the invention include those described in JP-A No. H8-67822; examples of perylene dye which can be used in the invention include those described in JP-A No. S62-129380; and examples of mericyanine dye which can be used in the invention include those described in JP-A No. 2002-241758. One or more of these may be used herein either singly or as combined.

Examples of a polarizing element prepared by using a discotic dichroic dye include a polarizing element provided by OPTIVA Inc., which is known as "E-type polarizing element", containing a liothropic liquid crystal. For example, herein mentioned is the material described in JP-A No. 2002-90547. Similarly, also known is an example of using a bisazo-type dichroic dye having, as a discotically light-absorbing chemical structure, a string-shaped micelle-type structure; and this is described in JP-A No. 2002-90526. One or more of these may be used herein either singly or as combined.

For example, many rod-shaped dichroic dyes have a property of strongly absorbing light that vibrates in the long molecular axis direction. When the dichroic dye molecules having the property are arranged with their long axes kept in parallel to the z-axis direction, then the second polarizing element satisfying formula (2a) can be produced.

Many discotic dichroic dyes have a property of such that the absorption coefficient in the molecular discotic plane is large; and therefore, when such discotic dichroic dye molecules are arranged in such a manner that their discotic planes are kept perpendicular to the z-axis and that the discotic molecules are piled up with their discotic planes kept the same in the z-axis direction, then the second polarizing element satisfying formula (2b) can be produced.

For example, using a technique of guest-host liquid-crystal cells, dichroic dye molecules can be arranged in a desired manner as above, as following the alignment of guest liquid crystals. Concretely, a dichroic dye to be a guest and a liquid crystal to be a host are mixed and the host liquid crystal molecules are aligned, the dichroic dye molecules are also aligned along the alignment of the liquid crystal molecules, and the alignment state is thus fixed to thereby produce the second polarizing element. In order that the polarizing capability of the polarizing element does not change in different service conditions, it is desirable that the alignment state of the above-mentioned dichroic dye is fixed via formation of chemical bonding. For example, polymerization of the host liquid crystal, the dichroic dye or an optional polymerizing component may be promoted, and the alignment may be thereby fixed. For the fixation method, employable are various techniques of producing a retardation film with a curable liquid-crystal composition that are proposed in the art.

A guest-host liquid-crystal cell that has a liquid-crystal layer containing at least a dichroic dye and a host liquid crystal, as sandwiched between a pair of substrates, is also usable as the second polarizing element. The alignment of the host liquid crystal molecules (and the alignment of the dichroic dye molecules along with the liquid crystal molecules) can be controlled by the alignment film formed inside the substrate; and so far as any external force such as an external electric field or the like is not imparted to them, the alignment state is kept as such, and the polarizing characteristics of the second polarizing element can be thereby kept constant.

A dichroic dye may be infiltrated into a polymer film and the dichroic dye molecules may be aligned along the alignment of the polymer molecules in the film, whereby a polymer film that satisfies the requirements necessary for the second polarizing element can be produced. Concretely, a solution of a dichroic dye is applied onto the surface of a polymer film so that the dye is infiltrated into the film to produce the second polarizing element. The alignment of the dichroic dye molecules can be controlled by controlling the alignment of the polymer chains of the polymer film, or by controlling the properties thereof (chemical and physical properties such as the polymer chains and the functional group and others that the chains have) and the coating method, etc. The details of the method are described in JP-A No. 2002-90526. When a cellulose acylate film that is generally used as a protective film for polarizing plate is used as the polymer film, then the second polarizing element may serve also as the protective film for the first polarizing element.

The thickness of the second polarizing element is not specifically defined. In order that the element can satisfy formula (3), it is undesirable to make the element have too thick. From the viewpoint of reducing the thickness of the polarizing plate, the thickness of the second polarizing element is preferably thinner. In case where the second polarizing element is formed by coating, it is desirable that its thickness is within a range that realizes uniform coating. From this viewpoint, the thickness may be from 0.5 to 10 μm or so. Accordingly, in order that the second polarizing film formed by coating can satisfy formula (4), $kz_2$ is preferably from 0.004 to 0.08 or so. $kz_2$ can be controlled to fall within a preferred range by selecting a suitable dichroic dye from the viewpoint of the absorption coefficient and the molecular morphology thereof and/or by controlling the content of the dye. In an embodiment where the second polarizing element is a self-supporting polymer film, the thickness of the second polarizing film may be a general thickness of the polymer film, from 10 to 200 μm or so. Accordingly, in order that the second polarizing element of the polymer film can satisfy formula (4), $kz_2$ is preferably from 0.004 to 0.0002 or so. However, as so mentioned in the above, the second polarizing element satisfying formula (2b) attains the effect of the invention even when it does not satisfy formula (4); and therefore, the thickness and $kz_2$ of the second polarizing element are not defined to fall within the above-mentioned range.

EXAMPLES

The invention is described in more detail with reference to the following Examples, in which the amount and the ratio of the material, the reagent and the substance used, and the treatment with them may be suitably modified or changed not overstepping the sprit and the scope of the invention. Accordingly, the invention should not be limitatively interpreted by the Examples mentioned below.

[Production of Polarizing Plates 1a to 8a Satisfying Formula (2a)]

A polyvinyl alcohol film was processed to adsorb iodine to give a polarizing film. The polarizing film had $kx_1=0.022>ky_1=kz_1=4.6\times10^{-4}$, and satisfied formula (1). This was used as a first polarizing element. The thickness of the polarizing film was 20 μm, and $(kx_1-ky_1)\times d_1=431$ nm.

With reference to the method described in Example 2 in JP-A No. 2002-99388, a guest-host liquid-crystal cell was formed, and this was used as a second polarizing element. The liquid-crystal cell contains a rod-shaped dichroic dye (NKX-1366, by Nippon Photosensitive Dye Laboratory) and a host liquid crystal (ZLI-2806). In the cell, material for a vertical-alignment (LQ-1800, by Hitachi Chemical DuPont Microsystems) was previously applied to the substrate and dried thereon in order that the host liquid crystal molecules and the rod-shaped dichroic dye molecules could be aligned vertically to the substrate surface. The guest-host liquid crystal cell was checked in the front direction (the direction normal to the surface of the cell). Irrespective of the condition of the light running and polarizing through the cell, the light transmitted through it to look white. On the other hand, the cell was checked in oblique directions. The light polarizing in the thickness direction of the substrate was absorbed by the cell, while the light polarizing in the direction parallel to the substrate transmitted through the cell. The absorption coefficient of the formed cell was $kz_2=0.085>kx_2=ky_2=0.0005$, and this satisfied formula (2a). The cell was used as a second polarizing element, and this was stuck to the surface of the first polarizing element to fabricate a polarizing plate 1a.

In the same manner as above but changing the cell thickness and the dichroic dye concentration, various guest-host liquid-crystal cells having different $(kz_2-ky_2)\times d_2$ were prepared. This was stuck to the surface of the first polarizing element to fabricate various polarizing plates 2a to 8a. To the other surface of the first polarizing element to which the cell was not stuck, a protective cellulose acylate film (Tac Film, by FUJIFILM) was stuck.

[Production of Polarizing Plates 1b to 6b Satisfying Formula (2b)]

With reference to the method described in Example in JP-A No. 2002-90526, a dichroic dye was applied to the surface of a cellulose acylate film to produce a second polarizing element, as follows: Concretely, Compound 2 described in JP-A No. 2002-90526 was produced according to the description of Example therein, as a dichroic dye having discotic absorption characteristics. Six grams of the compound was collected, and dissolved and dispersed in 34 mL of water at room temperature. Next, using SMT's Ultrasonic Homogenizer UH-50, this was ultrasonically dispersed for 10 minutes to give a uniform solution-dispersion of dichroic dye aggregates. The process readily gave aggregates. The term "solution-dispersion of aggregates" as referred to herein means a dispersion of string-like micelle aggregates of stacked dichroic dye molecules, as dispersed in a solvent (water). Using a rod by hand, the dichroic dye aggregate solution dispersion was applied to a saponified triacetyl cellulose support (Z-Tac, by FUJIFILM) to fabricate a dichroic polarizing element. The dichroic polarizing element had $kz_2=0.02=kx_2>ky_2=0.0006$, and satisfied formula (2b). This was used as a second polarizing element, and stuck to the surface of the first polarizing element to fabricate a polarizing plate 1b.

In the same manner as above but changing the coating amount and the concentration of the dichroic dye, various dichroic polarizing elements having different $(kz_2-ky_2)\times d_2$ were prepared. This was stuck to the surface of the first polarizing element to fabricate various polarizing plates 2b to 6b. To the other surface of the first polarizing element to which the dichroic polarizing element was not stuck, a protective cellulose acylate film (Fujitac, by FUJIFILM) was stuck.

[Evaluation of Light Leakage Resistance in Oblique Directions in the Black State]

Two sheets of each of the fabricated polarizing plates 1a to 8a and polarizing plates 1b to 6b were prepared, and the two sheets were laminated with their polarization axes kept perpendicular to each other to fabricate samples. Every sample had the first polarizing element, the second polarizing element, the second polarizing element and the first polarizing element, as laminated in that order. Specifically, the second polarizing element of each polarizing plate was inside the perpendicularly-laminated two sheets of the polarizing plate. Light was given to the surface of the first polarizing element side (that is, the cellulose acylate film side) of each sample, at a polar angle of 60° and an azimuth angle of 45° relative to the surface, and the light transmittance through the sample was determined. The results are shown in Table 1 and Table 2 below. In following Tables 1 and 2, Comparative Example is a comparative sample comprising the above-mentioned polarizing film of the first polarizing element as protected with the above-mentioned cellulose acylate film on both surfaces thereof.

[Evaluation of Contrast Ratio with Incident Light in Oblique Directions]

Two sheets of each of the fabricated polarizing plates 1a to 8a and polarizing plates 1b to 6b were prepared, and the two sheets were laminated with their polarization axes kept in parallel to each other to fabricate samples. Every sample had the first polarizing element, the second polarizing element, the second polarizing element and the first polarizing element, as laminated in that order. Specifically, the second polarizing element of each polarizing plate was inside the parallel-laminated two sheets of the polarizing plate. Light was given to the surface of the first polarizing element side (that is, the cellulose acylate film side) of each sample, at a polar angle of 60° and an azimuth angle of 45° relative to the surface, and the light transmittance (white transmittance) through the sample was determined. From the data and the transmittance (black transmittance) in Table 1 and Table 2 below, the ratio of white transmittance/black transmittance of each sample was computed. The results are shown in Tables 1 and 2.

TABLE 1

|  | $(kz_2 - ky_2) \times d_2$ (nm) | Transmittance in the black state (%) | Contrast Ratio |
|---|---|---|---|
| Comparative Example | not having second polarizing element | 1.06 | 24 |
| Polarizing plate 1a | 5 | 0.79 | 33 |
| Polarizing plate 2a | 20 | 0.26 | 82 |
| Polarizing plate 3a | 40 | 0.02 | 1024 |
| Polarizing plate 4a | 60 | 0.09 | 196 |
| Polarizing plate 5a | 80 | 0.32 | 46 |
| Polarizing plate 6a | 100 | 0.62 | 17 |
| Polarizing plate 7a | 120 | 0.93 | 9 |
| Polarizing plate 8a | 130 | 1.09 | 7 |

TABLE 2

|  | $(kz_2 - ky_2) \times d_2$ (nm) | Transmittance in the black state (%) | Contrast Ratio |
|---|---|---|---|
| Comparative Example | not having second polarizing element | 1.06 | 24 |
| Polarizing plate 1b | 5 | 0.79 | 31 |
| Polarizing plate 2b | 20 | 0.30 | 67 |
| Polarizing plate 3b | 40 | 0.05 | 273 |
| Polarizing plate 4b | 60 | 0.01 | 1006 |
| Polarizing plate 5b | 80 | 0.02 | 353 |
| Polarizing plate 6b | 100 | 0.05 | 144 |

Of Polarizing plates 1a to 8a satisfying formula (2a), when $(kz_2-ky_2) \times d_2$ is from 5 nm to 120 nm, then the viewing angle dependence of the polarizing plates is reduced. From the viewpoint of realizing a higher contrast ratio over Comparative Example, it is understood that $(kz_2-ky_2) \times d_2$ is preferably from 5 to 80 nm, more preferably from 20 to 80 nm, even more preferably from 40 to 60 nm.

On the other hand, of Polarizing plates 1b to 6b satisfying formula (2b), even when $(kz_2-ky_2) \times d_2$ is more than 120 nm, the viewing angle dependence of the polarizing plates is still reduced and therefore the polarizing plates satisfy wide-view purpose. From the viewpoint of realizing a higher contrast ratio over Comparative Example, it is understood that $(kz_2-ky_2) \times d_2$ is preferably from 5 to 100 nm, more preferably from 40 to 100 nm, even more preferably from 60 to 80 nm.

[Production of Polarizing Plates 11a to 18a Satisfying Formula (2a)]

A polyvinyl alcohol film was processed to adsorb iodine to give a polarizing film. The polarizing film had $kx_1=0.022 > ky_1 = kz_1 = 4.6 \times 10^{-4}$, and satisfied formula (1). This was used as a first polarizing element. The thickness of polarizing film was 20 μm, and $(kx_1-ky_1) \times d_1 = 431$ nm.

As a supporting film for a second polarizing element, used was FUJIFILM's "Z-Tac Film". In-plane retardation Re and thickness-direction retardation Rth of the supporting film were both nearly 0 nm. After the film surface was saponified, an alignment film coating solution having a composition mentioned below was applied to the film, using a wire bar coater. This was dried with hot air at 60° C. for 60 seconds and then with hot air at 100° C. for 120 seconds, thereby forming a film on the support.

Composition of Alignment Film Coating Solution:

| Modified polyvinyl alcohol mentioned below | 10 mas. pts. |
|---|---|
| Water | 371 mas. pts. |
| Methanol | 119 mas. pts. |
| Glutaraldehyde | 0.5 mas. pts. |

Modified Polyvinyl Alcohol:

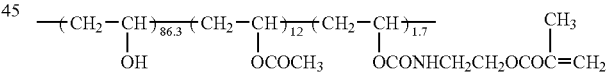

Next, 100 parts by mass of Liquid crystal compound 1 mentioned below, 3 parts by mass of a photopolymerization initiator (Irgacure 819, by Ciba Speciality Chemicals), 1.0 part by mass of an onium salt mentioned below, 0.2 parts by mass of an air-interface vertical aligning agent mentioned below, and following Dyes 1 to 5 each in an amount shown below (part by mass) were dissolved in methyl ethyl ketone to prepare a solution.

Liquid Crystal Compound 1:

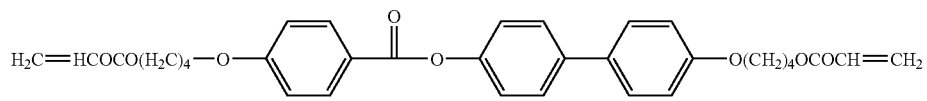

Onium Salt:
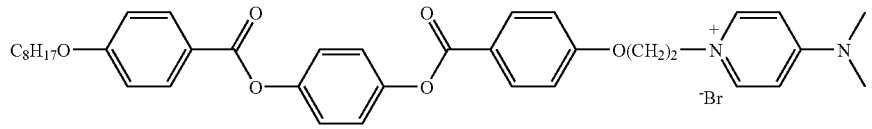
Air-Interface Vertical Aligning Agent:
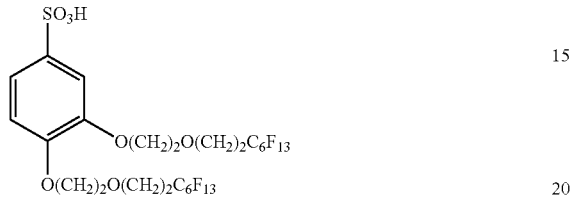
| Sample | Dye 1 (mas. pt.) | Dye 2 (mas. pt.) | Dye 3 (mas. pt.) | Dye 4 (mas. pt.) | Dye 5 (mas. pt.) | Thickness (μm) |
|---|---|---|---|---|---|---|
| 11a | 1.0 | 0.5 | 0.5 | 0.7 | 0.7 | 2 |
| 12a | 0.7 | 0.4 | 0.4 | 0.5 | 0.5 | 2 |
| 13a | 0.9 | 0.5 | 0.5 | 0.7 | 0.7 | 3 |
| 14a | 0.8 | 0.4 | 0.4 | 0.6 | 0.6 | 5 |
| 15a | 1.1 | 0.6 | 0.6 | 0.8 | 0.8 | 5 |
| 16a | 0.9 | 0.5 | 0.5 | 0.7 | 0.7 | 8 |
| 17a | 1.0 | 0.5 | 0.5 | 0.8 | 0.8 | 8 |
| 18a | 1.1 | 0.6 | 0.6 | 0.9 | 0.9 | 8 |
Dye 1
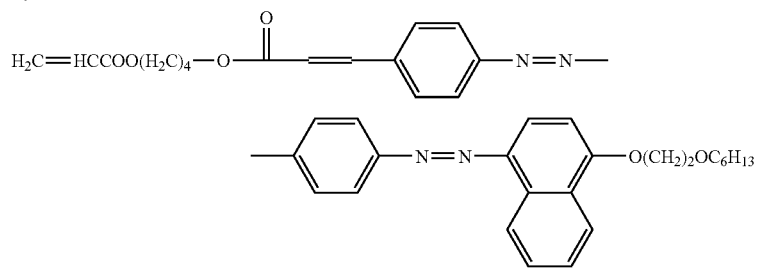
Dye 2
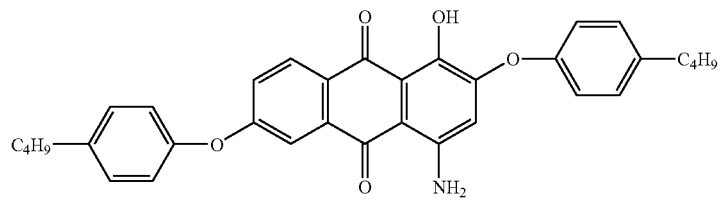
Dye 3
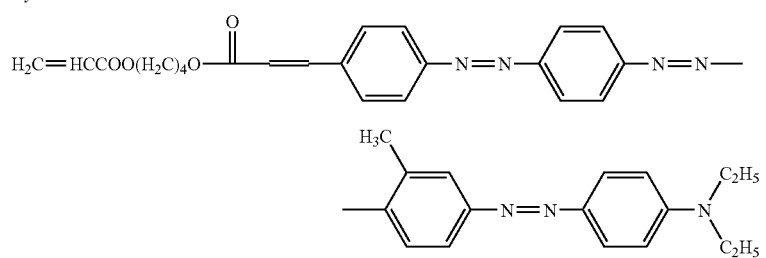

Dye 4

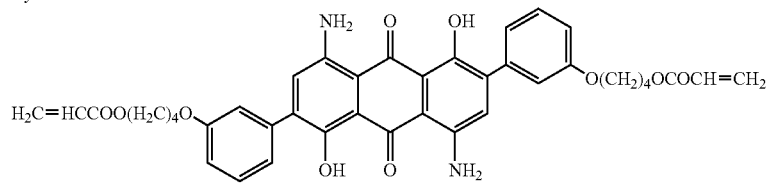

Dye 5

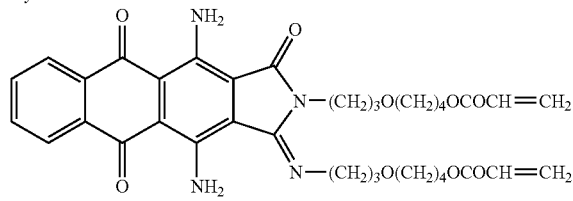

The coating solution prepared in the manner as above was applied to the surface of the alignment film, using a wire bar coater. This was stuck to a metal frame, heated in a thermostat bath at 135° C. for 1 minute, and then cooled to 120° C., and thereafter using a 120 W/cm high-pressure mercury lamp, this was irradiated with UV for 15 seconds to fix the alignment, and then this was left cooled to room temperature to form a film serving as a second polarizing element (this may be referred to as "light absorbing layer"). Thus formed, the film was observed with a microscope, and it was confirmed that all the molecules were aligned uniformly and perpendicularly to the film surface.

The polar angle dependence of the polarizing characteristics of the thus-formed light-absorbing layer was determined to confirm the absorption anisotropy of the layer. Concretely, using Axometics' Axoscan as an analyzer, the sample was analyzed for the Muller matrix within a polar angle range of from −50 to 5° at regular intervals of 10°. Based on the data, the degree of absorption anisotropy of the sample, as represented by $(kz_2-ky_2) \times d_2$ was determined through data fitting. The results are shown in the following Table.

The polarizing film for the first polarizing element fabricated in the above, and the light-absorbing layer-attached supporting film were stuck together. To the surface of the polarizing film for the first polarizing element, a triacetyl cellulose film (by FUJIFILM) was stuck for protection. Accordingly, polarizing plates 11a to 18a were fabricated.

[Evaluation of Light Leakage Resistance in Oblique Directions in the Black State]

Two sheets of each of the fabricated polarizing plates 11a to 18a were prepared, and the two sheets were laminated with their polarization axes kept perpendicular to each other at 0 degree and at 90 degrees to fabricate samples. Every sample had the first polarizing element, the second polarizing element, the second polarizing element and the first polarizing element, as laminated in that order. Specifically, the second polarizing element of each polarizing plate was inside the perpendicularly-laminated two sheets of the polarizing plate. Light was given to the surface of the first polarizing element side (that is, the cellulose acylate film side) of each sample, at a polar angle of 60° and an azimuth angle of 45° relative to the surface, and the light transmittance through the sample was determined. The results are shown in Table given below. In following Table, Comparative Example is a comparative sample comprising the above-mentioned polarizing film of the first polarizing element as protected with the above-mentioned cellulose acylate film (by FUJIFILM) on both surfaces thereof.

[Evaluation of Contrast Ratio with Incident Light in Oblique Directions]

Two sheets of each of the fabricated polarizing plates 11a to 18a were prepared, and they were laminated with their polarization axes kept in parallel to each other at 0 degree to fabricate samples. Every sample had the first polarizing element, the second polarizing element, the second polarizing element and the first polarizing element, as laminated in that order. Specifically, the second polarizing element of each polarizing plate was inside the parallel-laminated two sheets of the polarizing plate. Light was given to the surface of the first polarizing element side (that is, the cellulose acylate film side) of each sample, at a polar angle of 60° and an azimuth angle of 45° relative to the surface, and the light transmittance (white transmittance) through the sample was determined. From the data and the transmittance (black transmittance) in the following Table, the ratio of white transmittance/black transmittance of each sample was calculated. The results are shown in the following Table.

| | $(kz_2 - ky_2) \times d_2$ (nm) | Transmittance in the black state (%) | Contrast Ratio |
|---|---|---|---|
| Comparative Example | not having second polarizing element | 1.14 | 20 |
| Polarizing plate 11a | 5 | 0.83 | 31 |
| Polarizing plate 12a | 20 | 0.27 | 79 |
| Polarizing plate 13a | 40 | 0.03 | 922 |
| Polarizing plate 14a | 60 | 0.09 | 188 |
| Polarizing plate 15a | 80 | 0.35 | 42 |
| Polarizing plate 16a | 100 | 0.64 | 16 |
| Polarizing plate 17a | 120 | 0.98 | 9 |
| Polarizing plate 18a | 130 | 1.16 | 7 |

From the results shown in the above table, it is understood that Polarizing plates 11a to 17a of the invention are all wide-view polarizing plates, having improved light leakage resistance in oblique directions in the black state, or that is, having reduced viewing angle dependence, as compared with the polarizing plate of Comparative Example.

Of Polarizing plates 11a to 18a, when $(kz_2-ky_2) \times d_2$ is from 5 nm to 120 nm, then the viewing angle dependence of the polarizing plates is reduced. From the viewpoint of realizing a contrast ratio comparable to or higher than before, it is understood that $(kz_2-ky_2) \times d_2$ is preferably from 5 to 80 nm, more preferably from 20 to 80 nm, even more preferably from 40 to 60 nm.

What is claimed is:

1. A polarizing plate comprising at least first and second polarizing elements and satisfying following formulae (1) to (3):

$$kx_1 > ky_1 = kz_1 \qquad (1)$$

$$kz_2 > ky_2 \qquad (2)$$

$$(kx_1-ky_1) \times d_1 > (kz_2-ky_2) \times d_2 \qquad (3)$$

wherein an x-axis and a y-axis are in-plane axes crossing perpendicularly to each other, and a z-axis is the axis crossing perpendicularly to the x-y axis plane; $kx_1$, $ky_1$ and $kz_1$ each are the absorption coefficient in the x-axis, y-axis and z-axis directions, respectively, of the first polarizing element; $ky_2$ and $kz_2$ each are the absorption coefficient in the y-axis and z-axis directions, respectively, of the second polarizing element; and $d_1$ and $d_2$ each are the thickness (unit: nm) of the first and second polarizing elements, respectively.

2. The polarizing plate of claim 1, wherein the second polarizing element satisfies following formula (2a):

$$kz_2 > kx_2 = ky_2 \qquad (2a)$$

wherein $kx_2$ is the absorption coefficient in the x-axis direction of the second polarizing element.

3. The polarizing plate of claim 2, wherein the second polarizing element satisfies following formula:

$$5 \text{ nm} \leq (kz_2-ky_2) \times d_2 \leq 80 \text{ nm}.$$

4. The polarizing plate of claim 1, wherein the second polarizing element satisfies following formula (2b):

$$kz_2 = kx_2 > ky_2 \qquad (2b)$$

wherein $kx_2$ is the absorption coefficient in the x-axis direction of the second polarizing element.

5. The polarizing plate of claim 4, wherein the second polarizing element satisfies following formula:

$$5 \text{ nm} \leq (kz_2-ky_2) \times d_2 \leq 100 \text{ nm}.$$

6. The polarizing plate of claim 1, wherein the second polarizing element comprises molecules having absorption anisotropy for visible light.

7. A liquid-crystal display device comprising at least a liquid-crystal cell and a polarizing plate as set forth in claim 1.

* * * * *